(12) United States Patent
Arbel et al.

(10) Patent No.: US 12,554,578 B2
(45) Date of Patent: Feb. 17, 2026

(54) DRAM CONTROLLER WITH IN-LINE ECC (71) Applicant: XILINX, INC., San Jose, CA (US)

(72) Inventors: Ygal Arbel, Morgan Hill, CA (US);
Jonathan Jasper, San Jose, CA (US);
Abbas Morshed, Los Altos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/111,805

(22) Filed: Feb. 20, 2023

(65) Prior Publication Data

US 2024/0281325 A1  Aug. 22, 2024

(51) Int. Cl.
G06F 11/10 (2006.01)
G06F 12/0871 (2016.01)
G06F 12/0891 (2016.01)

(52) U.S. Cl.
CPC ...... *G06F 11/1068* (2013.01); *G06F 12/0871* (2013.01); *G06F 12/0891* (2013.01)

(58) Field of Classification Search
CPC ............. G06F 11/1068; G06F 12/0871; G06F 12/0891
See application file for complete search history.

(56) References Cited

U.S. PATENT DOCUMENTS

| 6,658,548 B1* | 12/2003 | Kochar | G06F 12/145 |
| | | | 708/203 |
| 9,632,869 B1* | 4/2017 | Lu | G06F 11/1052 |
| 2013/0132799 A1* | 5/2013 | Zhu | G06F 11/1048 |
| | | | 714/768 |
| 2020/0135291 A1* | 4/2020 | Takahashi | G11C 8/12 |
| 2020/0210340 A1* | 7/2020 | Zhang | G06F 12/0842 |
| 2020/0250098 A1* | 8/2020 | Ma | G06F 12/0846 |
| 2020/0278797 A1* | 9/2020 | Bavishi | G06F 3/0656 |
| 2021/0064464 A1* | 3/2021 | Thoss | G06F 11/3037 |
| 2024/0300537 A1* | 9/2024 | Krishnani | G06F 15/7807 |

\* cited by examiner

*Primary Examiner* — Guerrier Merant
*Assistant Examiner* — Jeffrey Andrew Yang
(74) *Attorney, Agent, or Firm* — Patterson + Sheridan, LLP (57) ABSTRACT An integrated circuit (IC) device includes processor circuitry configured to output a first memory command having a first memory address, and in-line error correction control (ILECC) circuitry configured to receive the first memory command and output the first memory command to a memory device. The ILECC circuitry includes an error correction code (ECC) cache configured to store a first local ECC associated with the first memory command in a first cache line.

20 Claims, 6 Drawing Sheets

DRAM CONTROLLER WITH IN-LINE ECC

BACKGROUND

Field

Examples of the present disclosure relate to storing error correction code (ECC) data in-line with user data of a memory device.

Description of the Related Art

Dynamic Random Access Memory (DRAM) is typically used in an integrated circuit. DRAM is widely used in integrated circuits where low-cost and high capacity memory is required. For example, a typical use of DRAM is in modern computers and graphic cards as the main memory also known as "graphics memory." DRAM may also be used in many portable devices and video game systems. DRAM advantageously provides a low cost and simple memory design.

Error correction code (ECC) is used for detecting and correcting errors in data transmitted over noisy communication channels. ECC is redundant data included in a data transmission. The redundancy allows for the detection of errors anywhere in the data transmission and allows the data transmission to be corrected without a retransmission.

SUMMARY

In one or more examples, an integrated circuit (IC) device includes processor circuitry configured to output a first memory command having a first memory address, and in-line error correction control (ILECC) circuitry configured to receive the first memory command and output the first memory command to a memory device. The ILECC circuitry includes an error correction code (ECC) cache configured to store a first local ECC associated with the first memory command in a first cache line.

In one or more examples, an in-line error correction control (ILECC) circuitry includes an error correction code (ECC) cache configured to store a first local ECC associated with a first memory command having a first memory address in a first cache line of the ECC cache and provide the first local ECC to an ECC circuitry configured to receive the first local ECC from the ECC cache, receive first data from a memory device based on the first memory command, and perform ECC operations on the first data based on the first local ECC.

In one or more examples, a method for operating an integrated circuit (IC) device includes generating a first memory command having a first memory address, receiving, by in-line error correction control (ILECC) circuitry, the first memory command, and storing, by an error correction code (ECC) cache of the ILECC circuitry, a first local ECC associated with the first memory command in a first cache line of the ECC cache, and providing, by the ECC cache, the first memory command to a memory device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

A memory device, such as a dynamic random access memory (DRAM), includes error correction code (ECC) protection for data stored within the memory device. Conventionally, ECC protection is provided by using additional dedicated resources for storing and accessing the extra bits of data corresponding to ECC. For example a 64-bit DRAM channel may be implemented using a 72-bit channel with 8 extra bits dedicated to storage and access of ECC data. This is known as side-band ECC (SBECC). SBECC comes at the additional cost of extra DRAM components and extra DRAM bus interface signals.

Embodiments herein describe a memory device, such as a DRAM, that is able to store the extra ECC data in-line with the user data stored in the memory device. The additional ECC data is interleaved with the user data stored in a same DRAM array. The memory device is connected to a memory controller with an embedded in-line ECC (ILECC) circuitry including an ECC cache. The ECC cache stores multiple local ECCs in each cache line of the ECC cache. This allows memory commands to be assigned to ECCs without having to access the memory device each time. Thus, the memory device does not require the additional components and extra DRAM bus interface signals and reduces cost, board area, and power consumption among other advantages.

Figure 1:
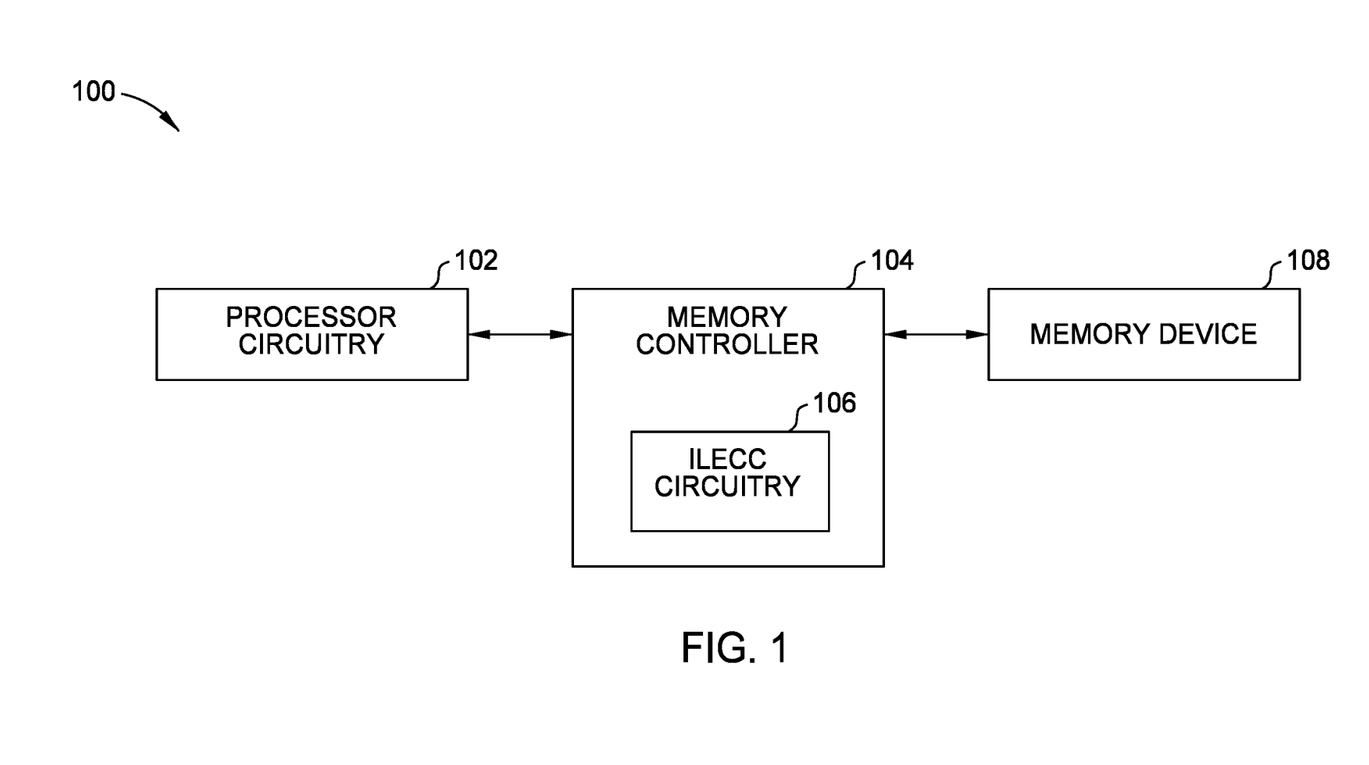
FIG. 1 illustrates an integrated circuit (IC) device, according to one or more examples.

FIG. 1 illustrates an integrated circuit (IC) device 100, according to one or more examples. The IC device 100 includes processor circuitry 102, a memory controller (MC) 104, and a memory device 108.

The processor circuitry 102 is configured to provide a memory command to the MC 104. In one example, the memory command is a read command. In another example, the memory command is a write command. The memory command is N bytes in length. The value of N depends on the bus configuration of the memory device 108. The value of N may be equal to any suitable length of the memory command. For example, if the memory device 108 is in x-32 configuration, N is equal to 64 bytes. If the memory device is in x-16 configuration, N is equal to 32 bytes. The memory device is interchangeable between x-32 and x-16 bus configurations.

The MC 104 includes an in-line error correction code (ILECC) circuitry 106. The ILECC circuitry 106 is configured to store ECCs locally. In one example, the MC 104 is a DDR5 or LPDDR5 DRAM controller. ECCs are an encoding scheme that are transmitted as binary bits that control errors in data over noisy communication channels. ECCs are redundant information included in data that allows errors to be detected and fixed in the data without a retransmission. The ILECC circuitry 106 is configured to generate ECCs based on whether a memory command is a write command. The ILECC circuitry 106 is configured to store ECCs provided by the memory device 108 based on a memory command in a read command. The ILECC circuitry 106 is also configured to write locally stored ECCs to the memory device 108. The above operations of the ILECC circuitry 106 are described in more detail below.

The memory device 108 may be a DRAM, among other types of memory. In one example, the memory device 108 stores ECCs in-line with stored user data. Stated differently, the memory device 108 stores the ECCs in memory lines that are interleaved with memory lines that store user data. For example, if the memory device 108 is in x-32 bus configuration, the memory device alternates between 512 bytes of user data and 64 bytes of ECCs, or if the memory device 108 is in x-16 bus configuration, the memory device alternates between 256 bytes of user data and 32 bytes of ECCs. Advantageously this allows the memory device to store ECCs without the use of any additional components and/or bus interfaces. The ILECC circuitry 116 architecture supports the memory device 108 and allows the memory device 108 to operate efficiently in both an x-32 bus configuration and an x-16 bus configuration, among others, by using the different data/ECC interleaving schemes. Interleaving ECCs and user data within a memory device 108 is described in more detail below. In another example, the memory device 108 is partitioned to store ECCs and user data is separate regions of the memory device 108.

Figure 2:
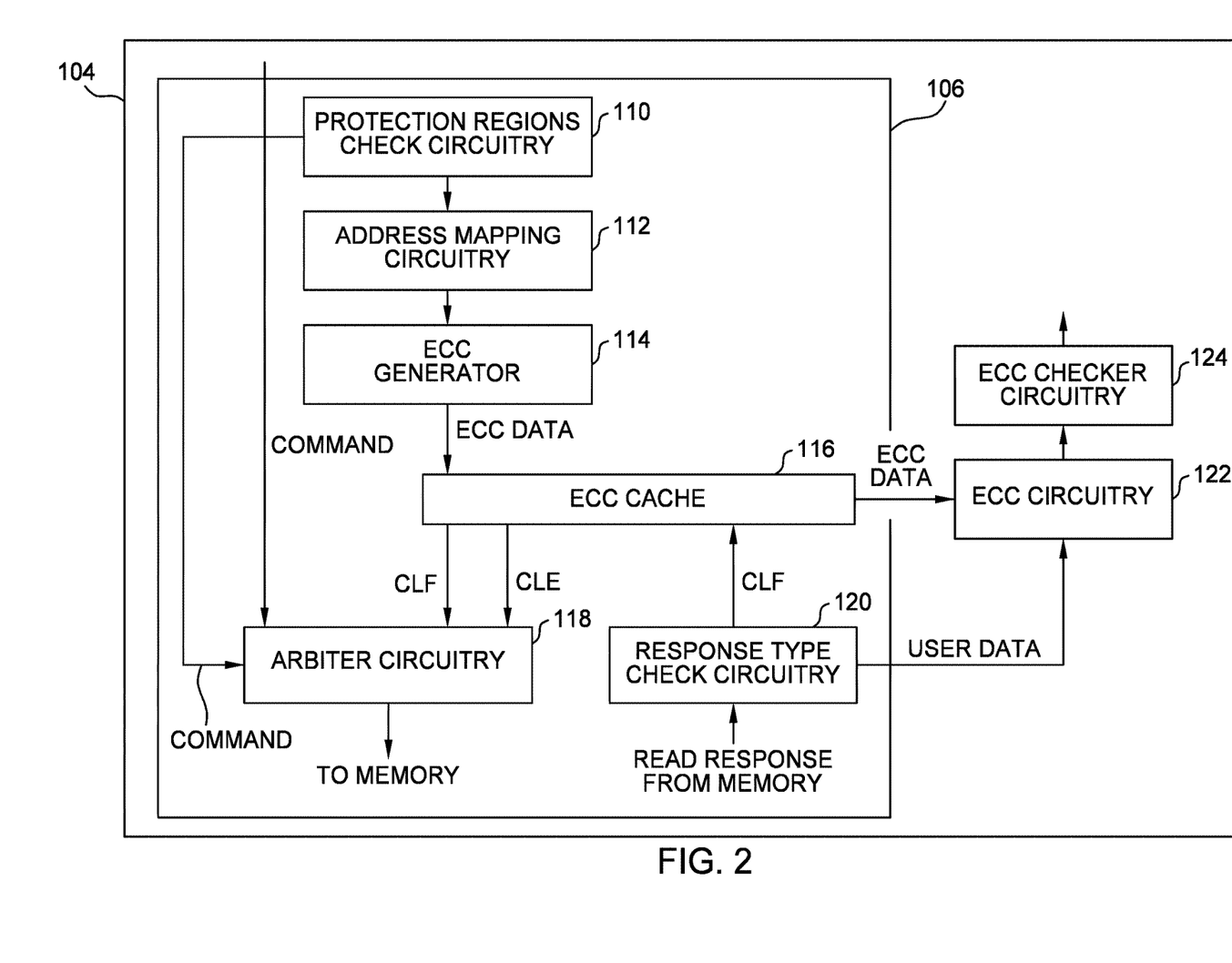
FIG. 2 illustrates a memory controller (MC) according to one or more examples.

FIG. 2 illustrates the MC 104 according to one or more examples. As is described above, the MC 104 includes the ILECC circuitry 106, ECC circuitry 122, and ECC checker circuitry 124. The ILECC circuitry 106 is connected to the ECC circuitry 122. The ECC circuitry 122 is connected to the ECC checker circuitry 124. The ILECC circuitry 106 provides local ECCs to the ECC circuitry 122. The ECC circuitry 122 and the ECC checker circuitry 124 perform ECC operations on data received from a memory device (e.g., memory device 108).

The ILECC circuitry 106 includes protection regions check circuitry 110, address mapping circuitry 112, ECC generator circuitry 114, ECC cache 116, arbiter circuitry 118, and response type check circuitry 120.

In one example, the MC 104 receives a first memory command from the processor circuitry 102. The first memory command is provided by the processor circuitry 102 to the protection regions check circuitry 110. The first memory command includes a first memory address indicating a location of the memory device 108 data is to be read from or written to. The protection regions check circuitry 110 determines whether the first memory address is within a protected region of the memory device 108. In one example, protected regions of the memory device 108 are regions of the memory device 108 where critical user data that must be ECC protected is stored. An unprotected region of the memory device 108 is a region of the memory device 108 where non-critical user data that is not protected by ECC is stored.

If the protection regions check circuitry 110 determines that the first memory address is within an unprotected region of the memory device 108, the first memory command is provided directly to the arbiter circuitry 118.

Figure 3:
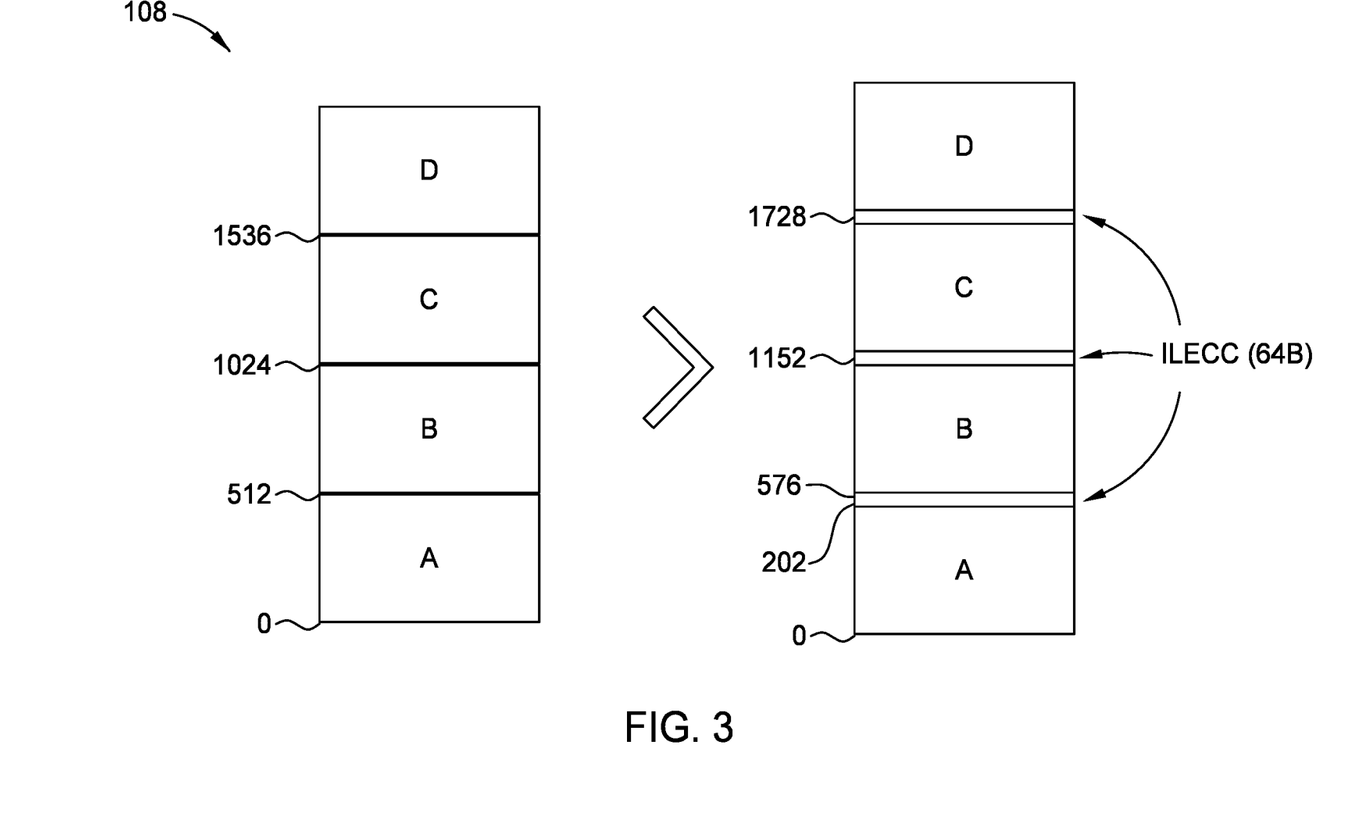
FIG. 3 illustrates a configuration of a memory device according to one or more examples

On the other hand, if the protection regions check circuitry 110 determines that the first memory address is within a protected region of the memory device 108, the memory command is provided to the address mapping circuitry 112. The address mapping circuitry 112 maps the memory address from a first line to a second line (or a first address to a second address) within the memory device 108. As illustrated in FIG. 3, the ECCs are stored within the memory device 108 and in-line with the user data stored within the memory device 108. Accordingly a memory having an address of 512 is remapped to address 576. As will described in more detail below, ECCs may be stored in gaps between memory blocks of the memory device 108 that are not accessible by a user. A user will still see the memory device 108 as having continuous addresses. Therefore, to account for the changes in address in the memory device the address mapping circuitry 112 remaps the memory address of the memory command to an updated address of the memory device 108. Advantageously this allows for ECCs and user data to be interleaved in the memory device 108.

The address mapping circuitry then provides the remapped first memory command to an ECC generator 114. The ECC generator 114 generates a local ECC based on the first memory command based on its type. If the first memory command is a read command the ECC generator 114 will not generate a local ECC. If the first memory command is a write command, the ECC generator 114 will generate a local ECC.

The ECC generator 114 provides the remapped first memory command along with the local generated ECC (if any) to the ECC cache 116.

The ECC cache 116 includes a plurality of cache lines. Each of the plurality of cache lines are the same length as each memory command, and therefore, are configured to store multiple ECCs. For example, when the memory device 108 is in x-32 bus configuration, the ECC cache line length is 64 bytes, and when the memory device 108 is in x-16 bus configuration, the ECC cache line length is 32 bytes. In another example the length of the cache lines are longer than the length of each memory command. Because ECCs that correspond to a memory command are shorter in length than a memory command, each cache line can be filled with multiple ECCs that correspond to sequential addresses in the memory device 108. In one example, if the memory command is 64 bytes, the associated ECC is 8 bytes. This allows for 8 ECCs of 8 sequential memory commands to be stored in a cache line of the ECC cache 116. The ECC cache 116 stores ECCs corresponding to sequential addresses in memory device 108 across each cache line. The possible states of a cache line are as follows: full and clean, full and dirty, partial and dirty, empty and assigned, and empty and unassigned. Each possible state, with the exception of empty and unassigned, are assigned to an address in the memory device 108. Each of these states will be described below.

In one example, the first memory command is a first write command. Because the first memory command is a write command, the ECC generator 114 generates a first local ECC corresponding to the first write command. The ECC generator 114 provides the first write command and the first local ECC to the ECC cache 116. Then the ECC cache 116 will check the status of each cache line. If a cache line is empty and unassigned, the ECC cache 116 will assign said cache line to the first memory address, which is included in the first write command, store the first local ECC in the cache line, and change the status of the cache line to partial and dirty. The ECC cache 116 provides the first write command to the arbiter circuitry 118. The arbiter circuitry 118 selects from one or more memory commands to output to the memory device. Thus, the arbiter circuitry 118 provides the first write command to the memory device 108. The ILECC circuitry 106 is compatible with full memory encryption. For write commands the memory command is encrypted before generating a local ECC.

In one example, the MC 104 receives a second write command. In one example, the second write command is a second memory command received immediately after the first write command. In another example, the MC 104 may receive read commands after receiving the first write command but prior to receiving the second write command.

The protection regions check circuitry 110 determines whether a second memory address of the second write command is within a protected region on the memory device 108. If the protection regions check circuitry 110 determines that the second memory address is within an unprotected region of the memory device 108, the second write command is provided directly to the arbiter circuitry 118.

On the other hand, if the protection regions check circuitry 110 determines that the second memory address is within a protected region of the memory device 108, the second write command is provided to the address mapping circuitry 112 for remapping.

For the reasons described above, the ECC generator 114 generates a second local ECC based on the second write command. Then the ECC cache 116 will determine whether the second memory address hits within the cache line storing the first local ECC. As described above, each cache line stores local ECCs corresponding to sequential memory addresses from the first memory address. For example, each memory command is 64 bytes, each corresponding ECC is 8 bytes, and each cache line is configured to store 64 bytes (or 8 ECCs). Therefore, the cache line storing the first local ECC is configured to store ECCs corresponding to the next 7 sequential memory addresses from the first memory address. The second local ECC hits within the cache line storing the first local ECC so long as the second memory addresses is one of the next 7 sequential memory addresses from the first memory address. This process is repeated for each write command until the cache line is filled. For example, a third write command having a third memory address would need to be within the 6 remaining memory addresses, and so on.

Once the cache line is full the status of the cache line is changed to full and dirty and newly generated local ECC codes cannot be added to the line. Upon receiving a new write command, the ECC cache 116 will check the status of each of its other cache lines. If a cache line in the is empty and unassigned the cache line will be assigned to memory address of the write command, the corresponding local ECC code will be stored in the cache line, and the status of the cache line is changed to partial and dirty.

On the other hand, if the ECC cache 116 determines that none of the cache lines are empty and unassigned, the ECC cache 116 selects a cache line to be evicted based on an eviction policy. In this case, the ECC cache 116 will provide a cache line evict (CLE) request to the arbiter circuitry 118 along the ECCs that are being evicted. The arbiter circuitry 118 will provide the memory device 108 with the ECCs and the address assigned to the cache line along with the request. Then based on the assigned address, the memory device 108 writes the ECCs to memory, and the ECC cache 116 can change the status of the cache line to empty and unassigned. From there, the ECC cache 116 can then store the generated local ECC code for the write command and change the status of the line to partial and dirty. In one example, the ECC cache 116 will evict a least recently used line. In another example, the ECC cache 116 evicts the least recently full and dirty line. In another example, the ECC cache 116 may use an early eviction policy and evict cache lines that are full and dirty.

The arbiter circuitry 118 is configured to implement an ordering requirement for the memory device 108.

In another example, if the second memory address does not hit within the cache line storing the first local ECC (e.g., the second memory address is not within the next 7 sequential memory addresses), a new cache line is allocated. The new cache line may be allocated by assigning an empty or unassigned cache line, or by using a CLE request in the same manner described above.

In another example, the first memory command is a first read command. If the first memory command is a read command, the ECC generator 114 will not generate a local ECC code and will provide the first read command to the ECC cache 116. Upon receiving the first read command, the ECC cache 116 will check the status of its cache lines. If the ECC cache 116 determines that a cache line is empty and unassigned, the ECC cache 116 switches the status of the cache line to empty and assigned, and assign the cache line to the first memory address of the first read command indicating that a read command is pending. In one example, the assigned cache line is a first cache line. In other examples, the assigned cache line can be any cache line in the ECC cache 116. Then, the ECC cache 116 provides the first read command along with a cache line fill (CLF) request to the arbiter circuitry 118. The arbiter circuitry 118 provides the first read command and the CLF request to the memory device 108. The arbiter circuitry 118 is configured to implement an ordering requirement for the memory device 108. For example, the arbiter circuitry 118 prioritizes CLF requests over the read command. The arbiter circuitry 118 will provide the CLF request to the memory device 108 before it provides the read command. This prevents the read command from stalling unit the CLF request is fulfilled. The ILECC circuitry 106 also indicates to a controller scheduler of the memory device 108 (not shown) to maintain that a CLF request is fulfilled before the read request associated to the CLF request to prevent the controller scheduler from reordering transactions performed by the memory device 108.

The memory device 108 receives the CLF request and fills the entire first cache line with sequential ECCs stored in the protected regions of the memory device 108. The CLF request provides instructions to the memory device 108 to fill the entire first cache line by providing the stored ECC corresponding to the first memory address along with enough of the stored ECCs that correspond to the next sequential memory addresses to fill the cache line. As described above, each line of the ECC cache 116 is at least as long as the memory command. Because ECCs are shorter in length than a memory command, each line of the ECC cache 116 can be filled with multiple ECCs corresponding to sequential addresses. In one example, if the memory command is 64 bytes, the associated ECC is 8 bytes, this allows for 8 sequential ECCs to be stored in a line of the ECC cache 116.

The memory device 108 provides first data stored at the first memory address indicated by the first read command and the ECCs requested by the CLF request to the response type check circuitry 120. The response type check circuitry 120 reads the responses provided by the memory device 108. If the response type check circuitry 120 determines that the memory device 108 is providing ECCs, the response type check circuitry will provide the ECCs to the ECC cache 116. The ECC cache 116 stores the ECCs in the first (or any other assigned) cache line and changes the status of the first cache line to full and clean. After performing the cache line fill, the memory device 108 provides the first data that is stored in memory at the first memory address. Based on the response type check circuitry 120 determining that the memory device 108 is providing the first data in response to the read command, the response type check circuitry 120 will provide the first data to ECC circuitry 122. As described above, the arbiter circuitry 118 provides the CLF to the memory device 108 prior to the first read command ensuring the response type check circuitry 120 receives the ECCs first.

The ECC circuitry 122 receives the first data from the response type check circuitry 120, and receives the first local stored ECC corresponding to the first read command from the ECC cache 116. The ECC circuitry 122 performs ECC operations on the first data. In one example, the ECC operations include generating a calculated ECC based on the first data and providing the calculated ECC and the first local ECC to an ECC checker circuitry 124. The ECC circuitry 122 will then compare the first local ECC and calculated ECC and determine whether the first local ECC and calculated ECC are different. If the first local ECC and calculated ECC are different, the ECC checker circuitry 124 will correct the first data and provide the corrected first data back to the processor circuitry 102. On the other hand, if the local ECC and calculated ECC are the same, the ECC checker circuitry 124 will provide the first data to the processor circuitry 102 without performing any additional operations. As described above, the ILECC circuitry 106 is compatible with full memory encryption. For read commands the memory is decrypted after the ECC checker circuitry 124 compares (checks) the ECCs.

On the other hand, if the ECC cache 116 determines that none of the lines are empty and unassigned, the ECC cache 116 selects a cache line to be evicted in the same manner described above. The ECC cache 116 changes the status of the evicted cache line from full and dirty (or partial and dirty) to empty and assigned, and assign the first memory address to the evicted line. Then the steps described above may be repeated.

After receiving the first read command, the MC 104 may receive a second read command. In one example, the second read command is a second memory command received immediately after the first command. In another example write commands may be received between the first and second read commands.

After receiving the second read command, the ECC cache 116 determines whether the second memory address of the second read command is hits within the first cache line. The second read command hits within the first cache line if the second memory address is associated to any of the ECCs stored within the first cache line. For example, if the first cache line stores 8 ECCs, the second read command hits within the first cache line if the second memory address one of the next 7 sequential memory addresses with respect to the first memory address. If the second memory address hits within the first cache line, the ECC cache 116 will only provide the second read command to the arbiter circuitry 118. Advantageously, this improves the speed and efficiency of the memory device 108 because ECCs associated with sequential read commands are already stored locally in the MC 104 and do not require the MC 104 to access the memory to fetch an additional ECC. For example, if the memory commands are 64 bytes, each line of the ECC cache 116 can store 8 ECC codes. Therefore seven additional read commands can be performed without performing a CLF as long as their memory addresses are sequential. On the other hand, if the second memory address does not hit within the first cache line, the ECC cache 116 will allocate a new cache line, and fill said cache line using a CLF request. Furthermore, if a further read command (e.g., a third read command) has the next sequential memory address to the memory address of the first write command, the ECC cache 116 will not allocate a new cache line nor perform a new CLF request because the ECC corresponding to the further read command is already stored. Furthermore, read commands that have sequential memory addresses corresponding to ECCs in a single cache line use a single CLF request. For example, if a first and third read command have sequential memory addresses, an additional CLF request is not required for the third read command. Using the example described above, 8 read commands with sequential addresses only require one CLF request even if all 8 read commands are not received consecutively.

Figure 4:
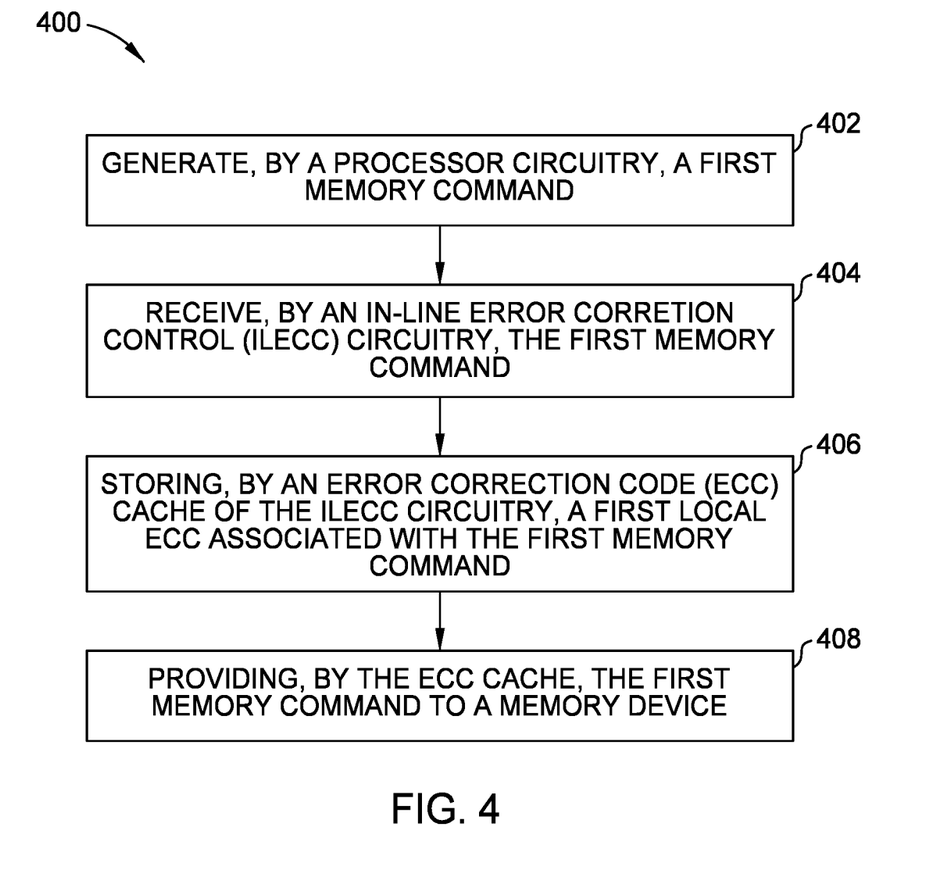
FIG. 4 illustrates a flow chart of a method for operating an IC device according to one or more examples.

FIG. 3 illustrates a configuration of a memory device 108 according to one or more examples. As illustrated in FIG. 3 and described above each memory block of the memory device 108 may be expanded and include in line ECC data in protected regions of the memory device that are not accessible by a user. The ECC data is provided in gaps 202 that are not accessible to the processing circuitry 102. This allows the user data and the ECC data to be interleaved in memory while presenting the memory address space as continuous. As described above, because the memory addresses of the memory device 108 as continuous, the address mapping circuitry 112 remaps the user addresses to provide the gaps 202 in the memory used for ECC storage. In another example, the memory device 108 is partitioned to store ECCs and user data in separate contiguous portions of the memory device 108. FIG. 4 illustrates a flow chart of a method 400 for operating an IC device 100 according to one or more examples.

FIG. 4 is described with reference to FIGS. 1-3. At block 402 a processor circuitry 102 generates a first memory command. The first memory command is provided to an MC 104. The memory command is either a read command or a write command and includes an address of the memory device 108.

At block 404, the first memory command is received by the ILECC circuitry 106 included in the MC 104.

At block 406, the ECC cache 116 of the ILECC circuitry 106 stores a first local ECC associated with the first memory command. The first local ECC associated with the first memory command may be generated by ECC generator 114 of the ILECC circuitry 106 if the first memory command is a write command. As described above, the first local ECC associated with the first memory command may be received by the ECC cache 116 in response to the ECC cache 116 providing a CLF request to memory device 108 if the first memory command is a read command.

At block 408, the ECC cache 116 provides the first memory command to the memory device 108. The first memory command is provided to the memory device 108 via arbiter circuitry 118 in the same manner described above.

Figure 5:
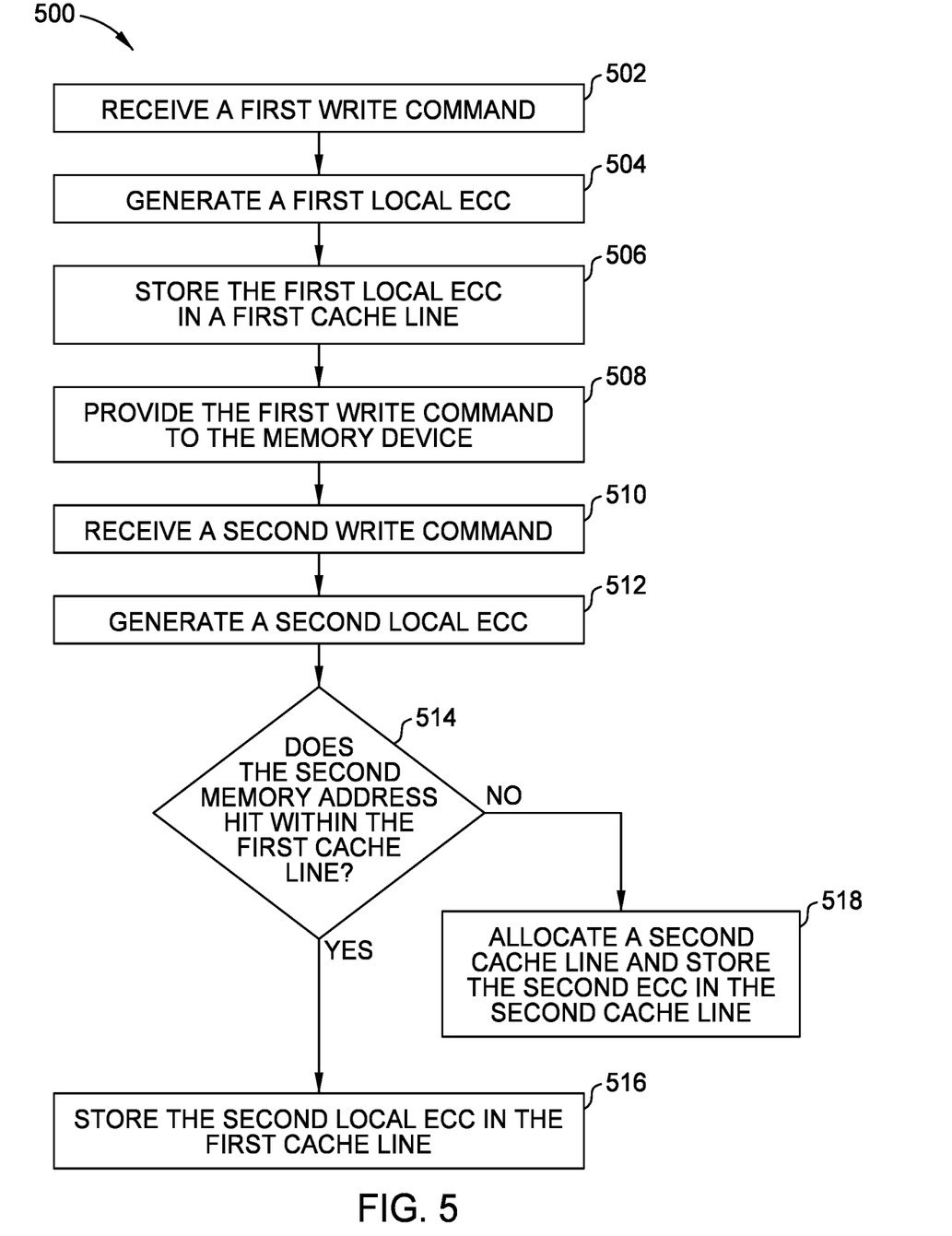
FIG. 5 is flow chart of a method for operating an IC device based on a write command according to one or more examples.

FIG. 5 is flow chart of a method 500 for operating an IC device 100 based on a write command according to one or more examples. FIG. 5 is described with reference to FIGS. 1-4.

At block 502, the MC 104 receives a first write command from the processor circuitry 102. In one example, the first write command corresponds to a protected region of the memory device 108. Therefore, as described above, a first memory address corresponding to the first write command is remapped by the address mapping circuitry 112 because ECC data is interleaved with user data in the memory device 108. The address mapping circuitry 112 provides the first memory command including the remapped address to the ECC generator 114. In another example, if the first memory address corresponds to an unprotected region of the memory device 108, the first write command is provided directly to arbiter circuitry 118.

At block 504, the ECC generator 114 generates a first local ECC corresponding to the first write command and provides the first local ECC and the first write command the ECC cache 116.

At block 506, the first local ECC is stored in a first cache line. In the same manner described above, the first local ECC is stored in an unassigned and empty cache line within the ECC cache 118. If each cache line is full a cache line is evicted using a CLE request, as described above. The evicted cache line is used as the first cache line and the first local ECC is stored in the first cache line.

At block 508 the ECC cache 116 provides the first write command to the memory device 108 via the arbiter circuitry 118.

At block 510, the MC 104 receives a second write command from the processor circuitry 102. In one example, a second memory address of the second write command corresponds to an unprotected portion of the memory device 108. As described above the second memory address is remapped by the address mapping circuitry 112 because ECC data is interleaved with user data in the memory device 108. The address mapping circuitry 112, then provides the second write command including the remapped address the ECC generator 114. As described above the second write request may be received directly after the first write command or at least one read command may be received by the MC 104 between write commands. In another example, if the second memory address corresponds to a protected region of memory, the second write command is provided directly to arbiter circuitry 118.

At block 512 the ECC generator 114 generates a second local ECC corresponding to the second write command and provides it to the ECC cache 116.

At block 514, the ECC cache 116 determines whether the second memory address hits within the same cache line as the first local ECC. This depends on both the length of the ECCs and the length of the cache line. Each cache line can store 8 local ECCs corresponding to write (or read) commands having sequential memory addresses regardless of the order the write commands are received. If the second memory address hits within the first cache line, the method proceeds to block 516 and the second local ECC is stored in the first cache line. On the other hand if the second memory address does not hit within the first cache line the method proceeds to block 518 and a second cache line in the ECC cache 118 is allocated in the method described above, and the second local ECC is stored in the second cache line.

Figure 6:
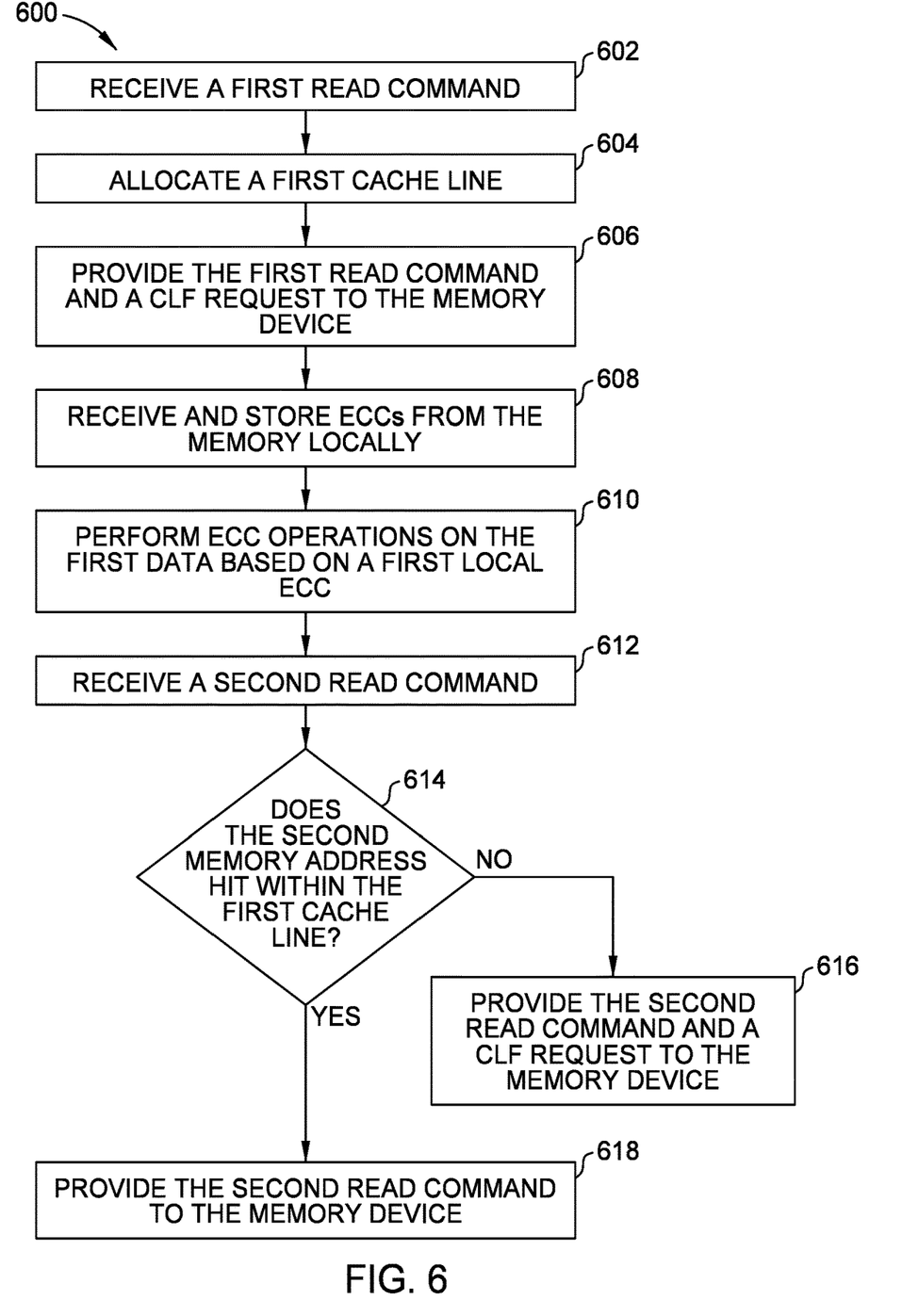
FIG. 6 is flow chart of a method for operating an IC device based on a read command according to one or more examples.

FIG. 6 is flow chart of a method 600 for operating an IC device 100 based on a read command according to one or more examples. FIG. 6 is described with reference to FIGS. 1-4.

At block 602, the MC 104 receives a first read command from the processor circuitry 102. In one example, the first read command corresponds to a protected region of the memory device 108. As described above, a first memory address corresponding to the first read command is remapped by the address mapping circuitry 112 because ECC data is interleaved with user data in the memory device 108. The address mapping circuitry 112, then provides the first read command including the remapped address the ECC generator 114. However as descried above, the ECC generator 114 does not generate an ECC in response to receiving a read command, provides the read command to the ECC cache 116. In another example, if the first memory address corresponds to an unprotected region of memory device 108, the first read command is provided directly to arbiter circuitry 118.

At block 604, the ECC cache 116 allocates a first cache line in the ECC cache 118. If the ECC cache 116 includes a cache line in an empty and unassigned state, the ECC cache 116 allocates the empty and unassigned cache line as the first cache line by assigning it to the first memory address. On the other hand if the ECC cache 116 does not include an unassigned and empty cache line, the ECC cache allocates a first cache line by performing a CLE in the same manner described above.

At block 606 the ECC cache 116 provides the first read command and a CLF request to the memory device 108 via arbiter circuitry 118. As described above the arbiter circuitry 118 provides the CLF request to the memory device 108 before the first read command.

At block 608, based on the memory device 108 receiving the CLF request, the memory device 108 provides the ECC corresponding to the first memory address along with ECCs corresponding to the next sequential addresses until the first cache line is full. The status of the first cache line is now full and clean. The ECCs are provided from the memory device 108 to the response type check circuitry 120. The response type check circuitry 120 determines the memory device 108 is providing ECCs, and provides the ECCs to the ECC cache 116. The ECC cache 116 then stores the ECCs in the first cache line.

At block 610, the ECC circuitry 122 receives first data read from the memory device 108 based on the first read operation. After providing the ECCs to the response type check circuitry 120, the memory device 108 provides the first data stored at the first memory address based on the first read command. The response type check circuitry 120 determines that the first data is being provided, and provides the first data to the ECC circuitry 122. Concurrently, the ECC circuitry 122 receives a first local ECC from the first cache line that corresponds to the first memory command. The ECC circuitry 122 performs ECC operations on the first data and the first local ECC. Performing ECC operations includes generating a calculated ECC code corresponding to the first data and providing the first data, the first local ECC and the calculated ECC to the ECC checker circuitry 124. The ECC checker circuitry 124 then compares the first local ECC and the calculated ECC and corrects the first data based on any differences between the first local ECC and the calculated ECC.

At block 612, the MC 104 receives a second read command from the processor circuitry 102. In one example, the second read command corresponds to a protected portion of the memory device 108. As described above, a second memory address corresponding to the second read command is remapped by the address mapping circuitry 112 because ECC data is interleaved with user data in the memory device 108. The address mapping circuitry 112, then provides the second read command including the remapped address the ECC generator 114. As described above, the second read command may be received directly after the first read command or at least one write command may be received by the MC 104 between read commands. The ECC generator then provides the second read command to the ECC cache 116.

At block 614 the ECC cache 116 determines whether the second memory address hits within the first cache line. If the second memory address hits within the second cache line the method proceeds to block 616 and the second read command is provided to the memory device 108 via arbiter circuitry 118. On the other hand, if the second memory address does not hit within the first cache line the second read command and a CLF request corresponding to a second cache line are provided to the memory device 108 via arbiter circuitry 118. The second cache line may be allocated in the same manner described above.

In the following, a memory device (e.g., memory device 108) is able to store extra ECC data in-line with the user data stored in the memory device. The additional ECC data is interleaved with the user data stored in a same memory array. The memory device is connected to a memory controller including an ILECC circuitry 106 that includes an ECC cache 116 that stores local ECCs. Advantageously, this allows for ECC processing to be performed on data supplied by the memory device without having to access ECCs from the memory device for memory commands having consecutive memory addresses. Thus, such a memory device does not require the additional components and extra DRAM bus interface signals and improves the speed and efficiency of the memory device.

While the foregoing is directed to specific examples, other and further examples may be devised without departing from the basic scope thereof, and the scope thereof is determined by the claims that follow.

What is claimed is:

1. An integrated circuit (IC) device comprising:
processor circuitry configured to output a first memory command having a first memory address; and
in-line error correction control (ILECC) circuitry configured to receive the first memory command and output the first memory command to a memory device, the ILECC circuitry comprising an error correction code (ECC) cache configured to store a first local ECC associated with the first memory command in a first cache line, wherein the first cache line is configured to store a second local ECC that is associated with a second memory command having a second memory address that is sequential to the first memory address, and the memory device comprises first memory lines that are used to store user data interleaved with second memory lines that are used to store ECC data that are located in gaps within the memory device that are not accessible to the processor circuitry, wherein the first memory lines comprise more memory than the second memory lines.

2. The IC device of claim 1, wherein the ILECC circuitry further comprises:
address mapping circuitry configured to receive the first memory command and remap the first memory address of the first memory command.

3. The IC device of claim 1, wherein the first memory command is a read command, and wherein the ECC cache is configured to provide the first local ECC to ECC circuitry configured to:
receive first data from the memory device based on the first memory command; and
perform ECC operations on the first data based on the first local ECC.

4. The IC device of claim 1, wherein the ILECC circuitry further comprises ECC generator circuitry configured to generate the first local ECC and provide the first local ECC to the first cache line of the ECC cache based on determining that the first memory command is a write command.

5. The IC device of claim 4, wherein the ECC cache is configured to allocate a second cache line within the ECC cache based on determining that a third memory address of a third memory command does not hit within the first cache line.

6. The IC device of claim 1, wherein the ILECC circuitry is operable to support both an x-32 bus configuration and an x-16 bus configuration.

7. The IC device of claim 1, wherein the ECC cache is configured to provide a cache line evict (CLE) request to arbiter circuitry of the ILECC circuitry based on determining that a new cache line needs to be allocated and that each cache line of the ECC cache is at least partially full.

8. The IC device of claim 1, wherein the first memory command is a first read command and the ECC cache is configured to:
receive a third memory command having a third memory address from the processor circuitry; and
based on determining that the third memory command is a read command and that the third memory address does not hit within the first cache line, provide an cache line fill (CLF) request to arbiter circuitry of the ILECC circuitry, wherein the CLF request instructs the memory device to fill a second cache line of the ECC cache.

9. An in-line error correction control (ILECC) circuitry comprising:
an error correction code (ECC) cache configured to store a first local ECC associated with a first memory command having a first memory address in a first cache line of the ECC cache and provide the first local ECC to ECC circuitry, wherein the first cache line is configured to store additional local ECCs that are associated with memory commands having sequential memory addresses from the first memory address, and the ECC circuitry is configured to:
receive the first local ECC from the ECC cache;
receive first data from a memory device based on the first memory command, the memory device comprising user data interleaved with ECC data that is stored in protected regions of the memory device; and
perform ECC operations on the first data based on the first local ECC.

10. The ILECC circuitry of claim 9, wherein the ILECC circuitry is included in a memory controller (MC).

11. The ILECC circuitry of claim 9, wherein the first memory command is a first read command and the ECC cache is configured to:
receive a second memory command having a second memory address from processor circuitry; and
based on determining that the second memory command is a read command and that the second memory address does not hit within the first cache line, provide an cache line fill (CLF) request to arbiter circuitry of the ILECC circuitry, wherein the CLF request instructs the memory device to fill a second cache line of the ECC cache.

12. The ILECC circuitry of claim 9, further comprising ECC generator circuitry configured to generate the first local ECC and provide the first local ECC to the ECC cache in response to determining that the first memory command is a write command.

13. The ILECC circuitry of claim 9, wherein the ECC cache is configured to provide a cache line evict (CLE) request to arbiter circuitry of the ILECC circuitry based on determining that a new cache line needs to be allocated and that each cache line of the ECC cache is at least partially full.

14. A method for operating an integrated circuit (IC) device comprising:
receiving, by in-line error correction control (ILECC) circuitry, a first memory command having a first memory address;
storing, by an error correction code (ECC) cache of the ILECC circuitry, a first local ECC associated with the first memory command in a first cache line of the ECC cache, wherein the first cache line is configured to store additional local ECCs that are associated with memory commands having sequential memory addresses from the first memory address; and
providing, by the ECC cache, the first memory command to a memory device, the memory device comprising first memory lines that are used to store user data interleaved with second memory lines that are used to store ECC data that are stored in protected regions of the memory device, wherein the first memory lines comprise more memory than the second memory lines.

15. The method of claim 14, further comprising:
receiving, by address mapping circuitry, the first memory command based on a determination by protection region check circuitry that the first memory command is associated with a protected region of the protected regions of the memory device wherein the protection region check circuitry is configured to receive the first memory command; and
remapping, by the address mapping circuitry, the first memory address associated with the first memory command.

16. The method of claim 14, wherein the first memory command is a read command and the method further comprises:
transmitting, by the ECC cache, the first local ECC to ECC circuitry; receiving, by the ECC circuitry, first data from the memory device based on the first memory command; and
performing, by the ECC circuitry, ECC operations on the first data based on the first local ECC.

17. The method of claim 14, further comprising:
receiving, by the ECC cache, a second memory command having a second memory address from processor circuitry; and
based on determining that the second memory command is a read command and that the second memory address does not hit within the first cache line, providing, by the ECC cache, a cache line fill (CLF) request to arbiter circuitry of the ILECC circuitry, wherein the CLF request instructs the memory device to fill a second cache line of the ECC cache.

18. The method of claim 14, further comprising determining, by an ECC generator of the ILECC circuitry, that the first memory command is a write command, generating the first local ECC based on the first memory command, and providing the first local ECC to the ECC cache.

19. The method of claim 14, further comprising storing the first local ECC in a protected region of the memory device.

20. The method of claim 14, further comprising:
providing, by the ECC cache, a cache line evict (CLE) request to arbiter circuitry of the ILECC circuitry based on determining that a new cache line needs to be allocated and that each cache line of the ECC cache is at least partially full.

* * * * *